United States Patent
Charters et al.

(10) Patent No.: US 9,342,340 B2
(45) Date of Patent: May 17, 2016

(54) VIRTUAL MODULE-BASED ULTRA-LAZY INSTALLATION FOR MODULAR SYSTEMS

(71) Applicant: International Business Machines Corporation, Armonk, NY (US)

(72) Inventors: Graham C. Charters, Southampton (GB); David J. Vines, Romsey (GB); Timothy J. Ward, Southampton (GB)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 673 days.

(21) Appl. No.: 13/661,820

(22) Filed: Oct. 26, 2012

(65) Prior Publication Data

US 2014/0123134 A1    May 1, 2014

(51) Int. Cl.
G06F 9/44 (2006.01)
G06F 9/445 (2006.01)
G06F 9/455 (2006.01)

(52) U.S. Cl.
CPC .............. *G06F 9/45558* (2013.01); *G06F 8/36* (2013.01); *G06F 8/61* (2013.01); *G06F 8/65* (2013.01); *G06F 2009/45562* (2013.01)

(58) Field of Classification Search
None
See application file for complete search history.

(56) References Cited

U.S. PATENT DOCUMENTS

| | | | |
|---|---|---|---|
| 6,317,870 B1 * | 11/2001 | Mattson, Jr. | 717/151 |
| 8,073,926 B2 | 12/2011 | Traut et al. | |
| 2006/0031547 A1 | 2/2006 | Tsui et al. | |
| 2009/0199178 A1 | 8/2009 | Keller et al. | |
| 2009/0241133 A1 | 9/2009 | Lineberger | |
| 2009/0293054 A1 | 11/2009 | Sheehan et al. | |
| 2009/0300604 A1 | 12/2009 | Barringer | |
| 2011/0185043 A1 | 7/2011 | Zeller et al. | |

OTHER PUBLICATIONS

Rellermeyer et al. R-OSGi: Distributed Applications through Software Modularization. [online] (2007). ACM., pp. 1-20. Retrieved From the Internet <http://citeseerx.ist.psu.edu/viewdoc/download-?doi=10.1.1.112.436&rep=rep1&type=pdf>.*

Kovachev et al. Mobile Cloud Computing: A Comparison of Application Models. [online] (Jul. 25, 2011). RWTH Aachen University., pp. 1-8. Retrieved From the Internet <http://arxiv.org/ftp/arxiv/papers/1107/1107.4940.pdf>.*

* cited by examiner

*Primary Examiner* — Emerson Puente
*Assistant Examiner* — Jonathan R Labud
(74) *Attorney, Agent, or Firm* — Lee Law, PLLC; Christopher B. Lee

(57) ABSTRACT

A virtual runtime module that omits an internal functional implementation of an associated executable module and that includes a runtime-resolvable public interface of the associated executable module is obtained using a processor within a module-based system. The virtual runtime module within the module-based system is resolved, using the runtime-resolvable public interface of the virtual runtime module, to satisfy dependencies associated with the executable module within the module-based system. At least a portion of the internal functional implementation of the associated executable module within the module-based system is installed during runtime using the resolved virtual runtime module.

17 Claims, 5 Drawing Sheets

US 9,342,340 B2

VIRTUAL MODULE-BASED ULTRA-LAZY INSTALLATION FOR MODULAR SYSTEMS

BACKGROUND

The present invention relates to modular systems. More particularly, the present invention relates to virtual module-based ultra-lazy installation for modular systems.

In computing, module-based systems may also be referred to as "modular systems." Modules used within modular systems may be large, complex, and/or expensive to access. Modules are installed at system startup and endure throughout the operations of the system.

BRIEF SUMMARY

A method includes obtaining, via a processor within a module-based system, a virtual runtime module that omits an internal functional implementation of an associated executable module and that comprises a runtime-resolvable public interface of the associated executable module; resolving, using the runtime-resolvable public interface of the virtual runtime module, the virtual runtime module within the module-based system to satisfy dependencies associated with the executable module within the module-based system; and installing, during runtime using the resolved virtual runtime module, at least a portion of the internal functional implementation of the associated executable module within the module-based system.

A system includes a memory and a processor programmed to: obtain, within a module-based system, a virtual runtime module that omits an internal functional implementation of an associated executable module and that comprises a runtime-resolvable public interface of the associated executable module; resolve, using the runtime-resolvable public interface of the virtual runtime module, the virtual runtime module within the module-based system to satisfy dependencies associated with the executable module within the module-based system; and install, within the memory during runtime using the resolved virtual runtime module, at least a portion of the internal functional implementation of the associated executable module within the module-based system.

A computer program product includes a computer readable storage medium having computer readable program code embodied therewith, where the computer readable program code when executed on a computer causes the computer to obtain, within a module-based system, a virtual runtime module that omits an internal functional implementation of an associated executable module and that comprises a runtime-resolvable public interface of the associated executable module; resolve, using the runtime-resolvable public interface of the virtual runtime module, the virtual runtime module within the module-based system to satisfy dependencies associated with the executable module within the module-based system; and install, during runtime using the resolved virtual runtime module, at least a portion of the internal functional implementation of the associated executable module within the module-based system.

BRIEF DESCRIPTION OF THE SEVERAL VIEWS OF THE DRAWINGS

Figure (FIG.) 1 is a block diagram of an example of an implementation of a system for virtual module-based ultra-lazy installation for modular systems according to an embodiment of the present subject matter;

Figure (FIG.) 2 is a block diagram of an example of an implementation of a core processing module capable of performing virtual module-based ultra-lazy installation for modular systems according to an embodiment of the present subject matter;

Figure 1:
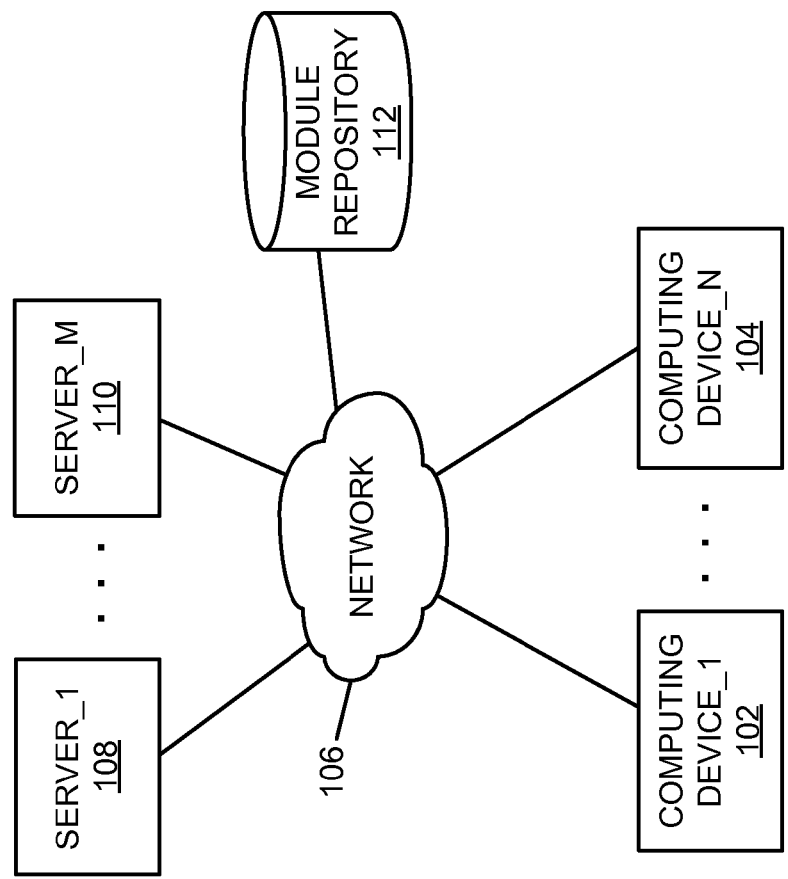

Figure (FIG.) 3 is a flow chart of an example of an implementation of a process for virtual module-based ultra-lazy installation for modular systems according to an embodiment of the present subject matter;

Figure (FIG.) 4A is a flow chart of an example of an implementation of initial processing within a process for virtual module-based ultra-lazy installation and reversion for modular systems according to an embodiment of the present subject matter; and Figure (FIG.) 4B is a flow chart of an example of an implementation of additional processing within a process for virtual module-based ultra-lazy installation and reversion for modular systems according to an embodiment of the present subject matter.

DETAILED DESCRIPTION

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides virtual module-based ultra-lazy installation for modular systems. The present technology operates by installing a "virtual module" within a modular (e.g., module-based) system in place of a "real" system executable module as soon as metadata that defines the interface for the system executable module is available. The virtual module has exactly the same dependencies and exposed feature interfaces (e.g., public interface) as the "real" system executable module, and allows the modular system to be started or for virtual modules to be installed after system startup without waiting to download the complete system executable module. The runtime may create a "virtual module" using the metadata for the real runtime executable module. As such, virtual modules may be constructed from metadata that defines a runtime resolvable interface for associated executable modules. Alternatively, virtual modules may be created by a module repository on demand, or may be created and stored with executable modules at the module repository, using the system interface definition metadata of the executable module. Accordingly, virtual modules may be installed and resolved within the system without the internal implementation of the associated executable modules. Processing to migrate installed virtual modules to executable modules may be performed on demand as module resources are accessed, or may be performed as a background task, as appropriate for a given module and implementation. As such, the virtual module-based ultra-lazy installation for modular systems is based upon creation/instantiation of virtualized modules at system startup or at other times to expedite system startup or to expedite module interface resolution, respectively, with subsequent modification of the virtualized modules to real executable system modules either as a background task or on demand in response to resource access/use requests. Internal implementations of executable modules may also be reverted to virtual implementations of either entire executable modules or for portions of internal implementations of executable modules, regardless of whether the executable modules were initially implemented as virtual modules.

For purposes of the present description, the phrase "ultra-lazy" refers to installation of the virtual module described herein at startup and at other times, followed by installation of an internal implementation of the "real" system executable module using a variety of possible techniques as described herein. Additionally, the terms "runtime module" and "executable module" may be used interchangeably herein.

The interface definition metadata describes the dependencies and features of the executable module so that the virtual module and the system may be "resolved" at startup and during runtime without the internal implementation of the executable module present in the running system. As such, the virtual module is implemented to run within the runtime system in place of the respective system executable module. Accordingly, the virtual module has the appearance of being loaded and other modules may express dependencies on the virtual module and may satisfy requirements from the virtual module. However, the resources that make up the implementation of the executable module (the core functionality of the real executable module) are not loaded and are not required to exist on the system at installation time. It is not until the virtual module is actually used (e.g., to provide classes or objects to other modules) that its implementation is loaded into the runtime and fully initialized.

With further respect to processing location options for implementation of the virtual module-based ultra-lazy installation for modular systems described herein, several possibilities exist. For example, a module repository may be implemented to provide both virtual module implementations and real executable module implementation, along with granular implementation variations between a fully-virtualized module and a fully-executable module. The module repository may be loaded with the fully-executable module, and the repository may create the virtualized module implementation on demand as requested or both versions of the modules may be stored. A naming convention may be established to distinguish between real executable and virtual module implementations within the module repository if both versions are stored. Additionally or alternatively, a given runtime system may be responsible for creating virtual module implementations and for migrating between the virtual module implementations and the fully-executable module implementations. As another alternative, the modules themselves may be implemented with logic (e.g., a proxy layer). The proxy layer may be operative to initially be installed as part of a virtual module implementation, and may facilitate the migration between the virtual module implementation and the fully-executable module implementation (e.g., for both installation and reversion). The proxy layer of a module may communicate with a module repository to request implementation components as appropriate. As such, many possibilities exist for implementation of the present subject matter and all such possibilities are considered within the scope of the present subject matter.

While the modular system is being started or as modules are to be installed into a system during runtime, several options may be performed to affect ultra-lazy loading of the real system executable module. As one option, the remainder of the internal implementation of the system executable module may be downloaded in the background, meanwhile filling in the virtual module with the real executable module implementation as the download occurs or when the download is complete. Any access to the respective module may be blocked until the download has completed and the full system executable module is in place and functional.

As another option for ultra-lazy loading of the real system executable module, the virtual module may wait until it is first accessed, at which point the virtual module may begin/trigger downloading of the real system executable module and/or the internal implementation to be filled into the virtual module to form the real system executable module. The virtual module may continue to block access until the download has completed and the full system executable module implementation is in place and functional.

As an additional option for ultra-lazy loading of the real system executable module, the virtual module may wait until it is first accessed, at which point it may determine which individual resources of the internal implementation are being accessed. In response to a resource access associated with the virtual module, the virtual module may begin/trigger downloading only the resources within the executable module that are determined to be needed by the respective access(es). The access to the respective individual resource may also be blocked until the respective resources are available/downloaded and functional.

With further reference to virtual module runtime considerations, when a virtual module is accessed, a determination may be made as to whether the respective resource has already been downloaded. If the respective resource has already been downloaded, then the respective resource may be loaded and used. If the respective resource has not yet been downloaded, a check may be performed to determine whether the respective resource is currently in the process of being downloaded. If the respective resource is currently being downloaded, the processing to access the resource may wait for the download to complete, then the respective resource may be loaded and used. If the resource is not currently being downloaded, then downloading of the respective resource may be initiated. This download may involve downloading the complete runtime module, or just the respective internal resource of the runtime module. Once the respective resource is downloaded, the respective resource may be loaded and used.

With further reference to virtual module installation considerations, a concise metadata description of each module is utilized to determine its relationships with other modules in the system. The metadata for the modules to be installed is downloaded at or before installation of the respective modules. As described above, this metadata is equivalent for both the executable and virtual versions of the respective modules. The metadata may either be available from the virtual or executable module itself (e.g., or from a module repository from which the modules may be obtained). Alternatively, a portion of the real executable module sufficient to identify the metadata interface (e.g., for dependency and resource integration) may be downloaded so that the metadata may be extracted.

It should further be noted that the metadata may be separated from the module and placed in location where the metadata may be accessed separately from the module implementation. For example, runtime modules may further be configured such that the metadata is the first part of the runtime module to be downloaded when the module is accessed. Alternatively, metadata may be stored with or separately from the runtime modules within a module repository. This type of metadata configuration for download allows the metadata download to be relatively small compared to a download of the full executable system module. As such, accessing the runtime module for its metadata from a module repository for the metadata to use for the construction/installation of a virtual module may occur with moderate use of bandwidth, and the download of the remainder of the runtime module implementation may be deferred using one of the options described above and in more detail below.

After all or a portion of the implementation of a real executable system module has been downloaded and installed, resource allocation, availability, and usage processing may be used to determine whether to revert all or a portion of the real executable system module back to its virtualized state to free the resources consumed by the initialized or partially-initialized module (e.g., a virtual module that has been either partially or completed migrated to/replaced with an executable module). This processing to free resources may be based, for example, upon configuration policies associated with resource allocation, availability, and usage, and the present technology may additionally revert some or all of the real executable system module back to its virtualized state.

For example, a system that may exploit the present technology may include an OSGi® framework (formerly known as Open Services Gateway Initiative). A module in OSGi® is called an OSGi® bundle. A bundle provides resources, classes, and services to other bundles and also requires resources, classes, and services from other bundles in the system. The OSGi® framework may initially create the lazy representation of one or more OSGi® bundles, and over time turn them into fully-initialized bundles with all internal functionality as the resources, classes, and services are requested. Based upon configuration policies, the framework may then choose to revert some or all of those bundles to the ultra-lazy forms to free resources. Services provided by the bundles may be replaced with factories that operate to recreate all or part of the real services if the respective portions of the provided services are requested. Bundle classloaders and resources may be cleaned up and/or written out to storage to be loaded back in if later requested.

The decision to revert a module that has been either partially or completed migrated to/replaced with an executable module may be made based upon a variety of policies as appropriate for a given implementation. For example, a determination to revert all or a portion of a module may be based upon a fixed interval of time of non-use of the module or of the respective portion of the module. Alternatively, a determination to revert all or a portion of a module may be based upon a least-recently used (LRU) basis when the server is running low on resources. Many other possibilities exist for determinations associated with reverting all or part of a module to free resources, and all such possibilities are considered within the scope of the present subject matter.

Regarding reversion of a module that has been either partially or completely migrated to an executable module and/or replaced with an executable module, an implementation environment that includes facilities for "weak" references may be used to facilitate reversion. Within such an implementation, a weak reference may also be created to all or part of the executable module. Objects with weak references may be collected during the garbage collection phase if the respective object is only referenced by weak references. As such, garbage collection processing associated with a virtual machine may then collect items referenced with weak references to accomplish the respective module reversion(s).

Further, as objects are garbage collected, weak references may further be placed onto a weak reference queue. The present technology may evaluate the weak reference queue to determine which objects have been collected. Once the entire portion of the at least partially executable module has been garbage collected (as determined by the weak reference queue), the module may be reverted.

Once the reversion has been completed to the point that the virtual module with its resolved public interface is all that remains installed (e.g., no internal executable module implementation), the respective module may again be considered to be the virtual module as originally installed without swapping the virtual module back into the system. As such, runtime processing may be conserved during reversion of executable modules to virtual modules.

As another alternative to implement module reversion of modules that have been either partially or completed migrated to/replaced with an executable module, modules may be designed with a proxy layer that allows reversion of the internal implementation portions of the module. The proxy layer may also accommodate re-implementation of the respective internal implementation details if a portion of the module is requested again. As such, the proxy layer may manage which portions of the module are fully implemented and which portions are virtualized. Similarly to the description above, once the reversion has been completed to the point that the virtual module with its resolved public interface and the proxy layer are all that remain installed (e.g., no internal executable module implementation beyond the proxy layer), the respective module may again be considered to be the virtual module as originally installed without swapping the virtual module back into the system.

It should further be noted that the weak reference option and the proxy layer option may be combined or further altered as appropriate for a given implementation. Additional variations of the technical implementation of the present subject matter are possible and all are considered within the scope of the present technology.

It should additionally be noted that conception of the present subject matter resulted from recognition of certain limitations associated with modular systems. For example, it was observed that, while some modular systems allow executable modules/assets to be loaded "lazily" into the runtime on a just in time (JIT) basis, such processing still requires the executable modules/assets to be available at installation time. Additionally, it was observed that if an executable module is lazily loaded (e.g., not installed at startup) using conventional technology, the runtime may ultimately be unresolvable for certain features when the respective features are used/accessed for the first time. It was further observed that if a given executable module is large, or if the executable module is only available over a slow network connection, then the system must still wait for the executable module to be available on the system before a system runtime may actually be started. It was further recognized that this scenario is particularly wasteful because a given executable module may not be accessed for some time after it is first installed, if it is ever even accessed at all. It was additionally observed that in some cases the delay caused by downloading the executable modules may be very long, potentially hours. In view of these several observations, it was determined that utilizing virtual modules during installation and runtime module installation, with ultra-lazy installation of system executable modules on demand, as described herein, may provide increased startup and runtime module installation performance for modular systems, and may provide reduced runtime size where executable modules are never accessed by the runtime. It was further determined that by integrating virtual modules using a metadata interface of the real system executable module, the runtime environment may be known to be consistent (e.g., resolvable) for all of its features when the runtime is first started, rather that discovering, as with conventional lazy-loading technology, that something does not work (e.g., resolve) the first time it is used/loaded. As such, the present subject matter improves modular systems by providing for virtual module-based ultra-lazy installation for modular systems, as described above and in more detail below. Accordingly, improved system performance may be obtained through the use of the virtual modules described herein.

By using a virtual module approach with ultra-lazy installation, as described herein, a module-based system may be started and modules may be installed during runtime much faster, with any associated performance penalty only being paid on the first access to a resource in a system executable module. It should additionally be noted that the running system only utilizes disk space for the code that is actually being run. As such, for a situation where few resources from a system executable module are accessed, the technology described herein may save significant time, bandwidth, and computation. It should further be noted that virtual modules may be installed for seldom-used features without bloating the runtime with internal implementation details for such modules that are seldom used.

The virtual module-based ultra-lazy installation for modular systems described herein may be performed in real time to allow prompt installation of virtual modules, with ultra-lazy installation of system executable modules on demand. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for virtual module-based ultra-lazy installation for modular systems. A computing device_1 102 through a computing device_N 104 communicate via a network 106 with several other devices. The other devices include a server_1 108 through a server_M 110. A module repository 112 stores modules and/or module definitions (e.g., interface metadata) associated with any implementation variant as appropriate for the respective implementation. The devices within the system 100 may access the module repository 112 to acquire or create virtual system modules. As described above, the system modules may be stored as real executable modules within the module repository 112, and either the module repository 112 or the respective device(s) may create the respective virtual modules.

As will be described in more detail below in association with FIG. 2 through FIG. 4B, the computing device_1 102 through the computing device_N 104 and the server_1 108 through the server_M 110 may each provide automated virtual module-based ultra-lazy installation for modular systems. The automated virtual module-based ultra-lazy installation for modular systems is based upon creation/instantiation of virtualized modules at system startup to expedite system startup or in association with runtime module installation to expedite module resolution, with subsequent modification of the virtualized modules to real executable system modules either as a background task or on demand in response to resource access/use requests. As described above and in more detail below, a variety of possibilities exist for implementation of the present subject matter, and all such possibilities are considered within the scope of the present subject matter.

It should be noted that any of the respective computing devices described in association with FIG. 1 may be portable computing devices, either by a user's ability to move the respective computing devices to different locations, or by the respective computing device's association with a portable platform, such as a plane, train, automobile, or other moving vehicle. It should also be noted that the respective computing devices may be any computing devices capable of processing information as described above and in more detail below. For example, the respective computing devices may include devices such as a personal computer (e.g., desktop, laptop, etc.) or a handheld device (e.g., cellular telephone, personal digital assistant (PDA), email device, music recording or playback device, tablet computing device, e-book reading device, etc.), a web server, application server, or other data server device, or any other device capable of processing information as described above and in more detail below.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The server_1 108 through the server_M 110 may include any device capable of providing data for consumption by a device, such as the computing device_1 102 through the computing device_N 104, via a network, such as the network 106. As such, the server_1 108 through the server_M 110 may each include a web server, application server, or other data server device.

Figure 2:
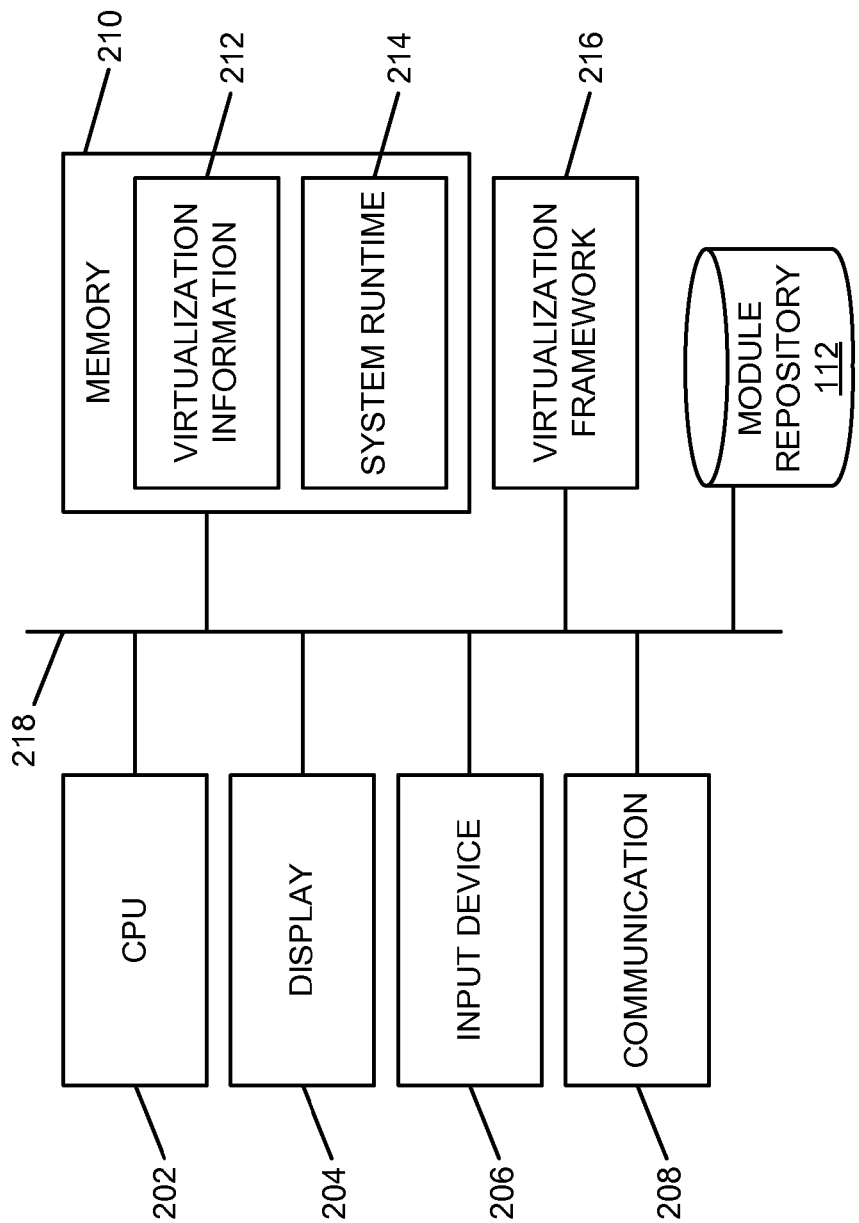

FIG. 2 is a block diagram of an example of an implementation of a core processing module 200 capable of performing virtual module-based ultra-lazy installation for modular systems. The core processing module 200 may be associated with either the computing device_1 102 through the computing device_N 104 or with the server_1 108 through the server_M 110, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of virtual module-based ultra-lazy installation for modular systems in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, or any other type of input device by which the user may interact with and respond to information on the display 204.

It should be noted that the display 204 and the input device 206 may be optional components for the core processing module 200 for certain implementations/devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides interconnection capabilities that allow the core processing module 200 to communicate with other modules within the system 100. The communication module 208 may include any electrical, protocol, and protocol conversion capabilities useable to provide interconnection capabilities, appropriate for a given implementation.

A memory 210 includes a virtualization information storage area 212 that stores virtualization information for virtual modules within the core processing module 200. The virtualization information may include information such as interface metadata for establishing interdependencies and resolving resources for virtual modules. Additionally, the virtualization information may identify modules that have been virtually loaded, modules that have been lazily loaded in part or completely, the location of executable system modules (e.g., within a module repository), and other information as appropriate for a given implementation.

A system runtime area 214 represents a memory area used for runtime module installations. The system runtime area 214 may be used to instantiate one or more virtual modules with one or more executable modules. Virtual modules or portions of virtual modules may be migrated to executable resources as a background operation or on demand. Further, executable resources may be reverted to virtualized resources to reduce system resource usage.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A virtualization framework module 216 is also illustrated. The virtualization framework module 216 creates and utilizes the virtualization information within the virtualization information storage area 212. The virtualization framework module 216 may initially install virtual modules, and subsequently perform the migration to fully-executable system modules within the system runtime area 214. The virtualization framework module 216 may also revert fully-executable system modules in whole or in part to virtual modules, as described above and in more detail below. The virtualization framework module 216 implements the automated virtual module-based ultra-lazy installation for modular systems of the core processing module 200.

It should also be noted that the virtualization framework module 216 may form a portion of other circuitry described without departure from the scope of the present subject matter. Further, the virtualization framework module 216 may alternatively be implemented as an application stored within the memory 210. In such an implementation, the virtualization framework module 216 may include instructions executed by the CPU 202 for performing the functionality described herein. The CPU 202 may execute these instructions to provide the processing capabilities described above and in more detail below for the core processing module 200. The virtualization framework module 216 may form a portion of an interrupt service routine (ISR), a portion of an operating system, a portion of a browser application, or a portion of a separate application without departure from the scope of the present subject matter. It should further be noted that the virtualization framework module 216 may form a part of the system runtime area 214, a part of each virtual module (e.g., as a proxy layer), or other form of implementation as appropriate.

The module repository 112 is also shown associated with the core processing module 200 within FIG. 2 to show that the module repository 112 may be coupled to the core processing module 200 without requiring external connectivity, such as via the network 106.

The CPU 202, the display 204, the input device 206, the communication module 208, the memory 210, the virtualization framework module 216, and the module repository 112 are interconnected via an interconnection 218. The interconnection 218 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. It should also be understood that, though the module repository 112 is illustrated as a separate component for purposes of example, the information stored within the module repository 112 may also/alternatively be stored within the memory 210 without departure from the scope of the present subject matter. Accordingly, the core processing module 200 may take many forms and may be associated with many platforms.

Figure 3:
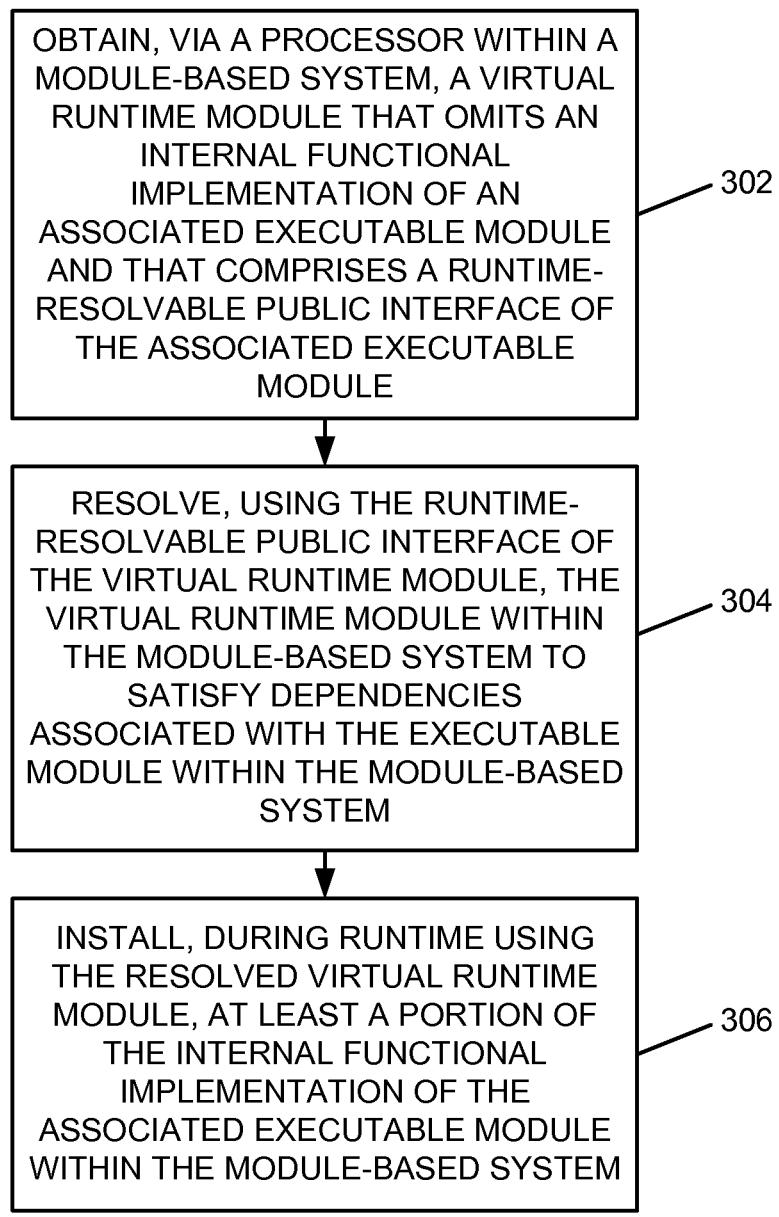
Figure 4A:
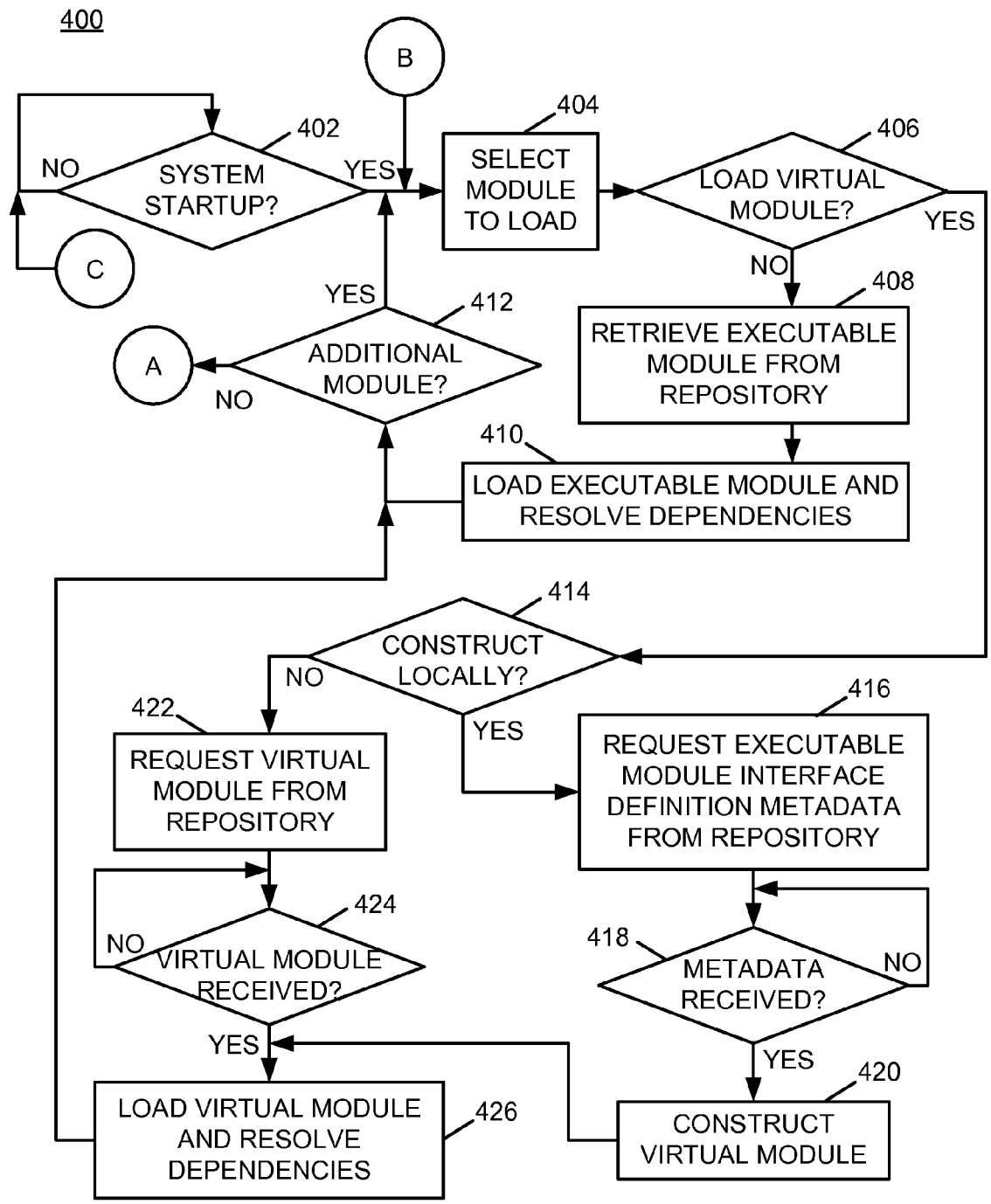
Figure 4B:
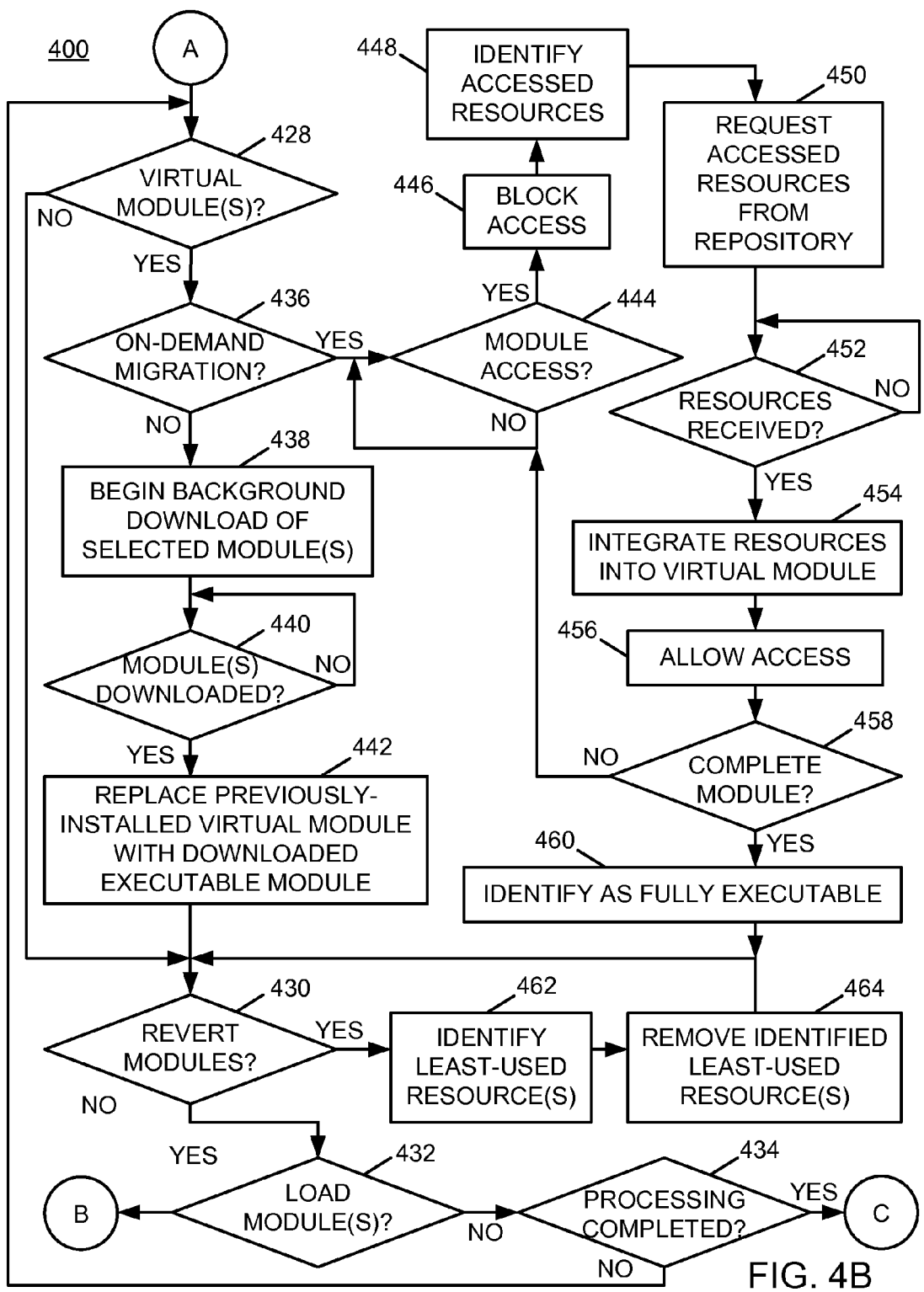

FIG. 3 through FIG. 4B described below represent example processes that may be executed by devices, such as the core processing module 200, to perform the virtual module-based ultra-lazy installation for modular systems associated with the present subject matter. Many other variations on the example processes are possible and all are considered within the scope of the present subject matter. The example processes may be performed by modules, such as the virtualization framework module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 3 is a flow chart of an example of an implementation of a process 300 for virtual module-based ultra-lazy installation for modular systems. At block 302, the process 300 obtains, via a processor within a module-based system, a virtual runtime module that omits an internal functional implementation of an associated executable module and that comprises a runtime-resolvable public interface of the associated executable module. At block 304, the process 300 resolves, using the runtime-resolvable public interface of the virtual runtime module, the virtual runtime module within the module-based system to satisfy dependencies associated with the executable module within the module-based system. At block 306, the process 300 installs, during runtime using the resolved virtual runtime module, at least a portion of the internal functional implementation of the associated executable module within the module-based system.

FIGS. 4A-4B illustrate a flow chart of an example of an implementation of a process 400 for virtual module-based ultra-lazy installation and reversion for modular systems. FIG. 4A illustrates initial processing within the process 400. It should be noted that the present example illustrates ultra-lazy virtual module installation with conversion of virtual modules to executable modules under a variety of circumstances, including installation of virtual modules at system startup and after system startup and illustrates subsequent reversion of executable modules back to virtual modules to reduce complexity of the present description. However, it should be understood that the respective module installations, conversions, and reversions may be performed on a module-by-module basis at any time as appropriate for a given implementation. Additionally, the processing associated with the process 400 may be multi-threaded with a separate thread assigned to process each module as appropriate at any stage of the processing described below.

At decision point 402, the process 400 makes a determination as to whether a system startup initiation has been detected. It should be noted that the determination of whether a system startup initiation has been detected is utilized within the present example for ease of example purposes and that any other event may be utilized to initiate the processing described herein, such as a system restart or other event, such as a module installation event after a system startup as described in more detail below. In response to determining at decision point 402 that a system startup initiation has been detected, the process 400 begins module loading processing and selects a module to load at block 404.

At decision point 406, the process 400 makes a determination as to whether to load the selected module as a virtual module or whether to load the full executable module. As such, the process 400 may make a determination on a module-by-module basis as to whether to load a virtual version of the respective selected module. In response to determining not to load the selected module as a virtual module, and to load the full executable module, the process 400 retrieves the executable module from the module repository, such as the module repository 112 at block 408. At block 410, the process 400 loads the executable module and resolves dependencies for the executable module to the extent possible based upon the currently-loaded executable modules and virtual modules that may have already been installed in the system. It is understood that module dependency resolution may be performed and continue throughout the module loading processing as resources upon which a given module is dependent are loaded and available for dependency resolution. It is further understood that the first iteration of the process 400 may result in deferral of resolution of more dependencies than subsequent iterations of the process 400.

At decision point 412, the process 400 makes a determination as to whether any additional modules are to be loaded during the current iteration of the process 400. It should be noted that modules used to start a system may be loaded at startup, while additional modules may be loaded after system startup as described in more detail below. In response to determining that at least one additional module is to be loaded during the current iteration of the process 400, the process 400 returns to block 404 to select the next module and iterates as described above.

Returning to the description of decision point 406, in response to determining to load the selected module as a virtual module instead of a full executable module, the process 400 makes a determination at decision point 414 as to whether to construct the virtual module locally or to request the respective virtual module from a module repository. The constructed virtual module may include a runtime-resolvable public interface of the associated executable module constructed using the metadata, yet may omit the internal functional implementation of the associated executable module.

As described above, a module repository, such as the module repository 112, may be configured to store both executable and virtual modules, or may be configured to construct virtual modules. As an additional alternative, executable modules may be constructed such that, in response to a request for an executable module, the public interface definition metadata that identifies system dependencies for the module may be the first portion of the module to be downloaded. This form of executable module construction may allow construction of virtual modules without storage of both executable and virtual modules, and may allow either the module repository or the device executing the process 400 to construct virtual modules. In view of the many options for storage and construction of virtual modules, the present example implements certain of these variations with the understanding that the process 400 may be modified to implement any such variation and that any such modifications are considered to be within the scope of the present subject matter.

Continuing with the present example, in response to determining at decision point 414 to construct the virtual module locally, the process 400 requests the executable module interface definition metadata from the module repository at block 416. The request for the executable module interface definition metadata may include a request for only the metadata that defines the runtime-resolvable public interface for the executable module. Alternatively, the request for the executable module interface definition metadata may include a request for the full executable module, where as described above, the executable module is configured and stored within the module repository such that the metadata that defines the public interface for the executable module is downloaded first by the module repository in response to requests for the executable module. Within the latter implementation, the process 400 may temporarily terminate download of the executable module in response to receipt of the metadata portion to construct the virtual module, with other portions up to the remainder of the executable module downloaded later as described above and in more detail below. A later download of the other portions up to the remainder of the executable module may resume from the end of the metadata portion of the download as coordinated between the process 400 and the module repository in any manner appropriate for a given implementation.

At decision point 418, the process 400 makes a determination as to whether the public interface definition metadata of the executable module has been received. In response to determining that the public interface definition metadata of the executable module has been received, the process 400 constructs the virtual module using the module description at block 420. As described above, the constructed virtual module may include only the runtime-resolvable public interface of the executable module so that the virtual module may be resolved within the module-based system as if the virtual module were the full executable module. As described above, where the module repository has initiated download of the full executable module, the process 400 may communicate with the module repository to temporarily terminate download of the remaining portions of the executable module to expedite system startup and/or virtual module interface resolution and reduce bandwidth consumption for in-system module resolution.

Returning to the description of decision point 414, in response to determining not to construct the virtual module locally and to instead request the respective virtual module from the module repository, the process 400 requests the virtual module from the module repository at block 422. As described above, where the module repository either stores both virtual and executable modules, or where the module repository is configured to construct virtual modules from public interface definition metadata of executable modules, the module repository may process and fulfill requests for virtual modules. Regardless of the particular implementation, the process 400 may obtain a virtual runtime module that omits an internal functional implementation of an associated executable module and that includes a runtime-resolvable public interface of the associated executable module. At decision point 424, the process 400 makes a determination as to whether the requested virtual module has been received.

In response to determining at decision point 424 that the requested virtual module has been received, or in response to constructing the virtual module locally at block 420, the process 400 loads the virtual module and resolves dependencies for the executable module within the module-based system using the public interface of the loaded virtual module at block 426. As such, the process 400 resolves, at startup of the module-based system and during runtime for runtime module installation, as described in more detail below, the runtime-resolvable public interface of the virtual runtime module within the module-based system to satisfy dependencies associated with the executable module within the module-based system. As described above, it is understood that module dependency resolution may be performed and continue throughout the module loading processing as resources upon which a given module is dependent are loaded and available for dependency resolution.

The process 400 returns to decision point 412 to determine whether at least one additional module is to be loaded during the current iteration of the process 400, and iterates as described above until all modules are loaded as either full executable modules or as virtual modules to facilitate dependency resolution for executable modules that have had loading of their internal implementation deferred to expedite system startup and to reduce resource consumption.

Returning to the description of decision point 412, for purposes of the present example, it is understood that once all modules needed to start a system are installed, the system may be started (not shown). Additionally, as described above and in more detail below, modules may be installed after system startup as appropriate for a given implementation. Regardless of the current iteration of the process 400, in response to determining that all modules to be loaded during the current iteration of the process 400, whether full executable or virtual modules, have been loaded and all dependencies have been resolved at decision point 412, the process 400 transitions to the processing shown and described in association with FIG. 4B.

FIG. 4B illustrates additional processing associated with the process 400 for virtual module-based ultra-lazy installation and reversion for modular systems. At decision point 428, the process 400 begins higher-level processing for virtual module migration to implement at least a portion of one or more executable module internal implementations within the module-based system, processing for reversion of internal implementations of executable modules to virtual modules, and processing to load additional modules (virtual or executable) during runtime. It should be noted that modules that were initially installed as executable modules may be reverted during runtime to virtual modules. As such, the present processing includes processing for installed executable modules. At decision point 428, the process 400 makes a determination as to whether any virtual modules exist within the system and whether to begin processing to migrate at least one virtual module to implement at least a portion of the executable module associated with the respective virtual module(s). To continue with the description of higher-level processing, details of an affirmative determination at decision point 428 will be described further below. As such, in response to determining at decision point 428 that no virtual modules exist within the system or not to begin processing to migrate at least one virtual module to implement at least a portion of the executable module associated with the respective virtual module(s), the process 400 makes a determination at decision point 430 as to whether to begin processing to revert any portion of an executable module to remove at least a portion of the internal implementation of the respective executable module(s) (whether partially executable or fully executable). Again, to continue with the description of higher-level processing, details of an affirmative determination at decision point 430 will be described further below. As such, in response to determining at decision point 430 not to begin processing to revert any portion of an executable module to remove at least a portion of the internal implementation of the respective executable module(s) (again whether partially executable or fully executable), the process 400 makes a determination as to whether to load one or more additional executable or virtual modules at block 432. With respect to this portion of the higher-level processing, in response to determining at decision point 432 to load at least one additional executable or virtual module, the process 400 returns to the processing described in association with FIG. 4A at block 404 and iterates as described above. To continue with the description of higher-level processing associated with FIG. 4B, in response to determining at decision point 432 not to load one or more additional executable or virtual modules, the process 400 makes a determination at decision point 434 as to whether processing has been completed. Once again, to continue with the description of higher-level processing, details of an affirmative determination at decision point 434 will be described further below. As such, in response to determining that processing has not been completed, the process 400 returns to decision point 428 and iterates at a higher level as described above. It should be noted that the processing associated with the respective decision points 428 and 430 may be made on a per-module basis, with appropriate variations in processing for each installed module.

Returning to the description of decision point 428, in response to determining that at least one virtual module exists within the system and to begin processing to migrate at least one virtual module to implement at least a portion of the executable module associated with the respective virtual module(s), the process 400 makes a determination at decision point 436 as to whether to perform on-demand migration of resources or whether to begin background download of an internal implementation of one or more executable modules. As described above, the processing associated with the process 400 may be multi-threaded with a separate thread assigned to process each module. As such, different determinations for different modules may be made on a module-by-module basis, and different threads may perform different processing for the respective modules.

Prior to describing the processing associated with the various branches of the process 400, it should be noted that the process 400 illustrates variations on processing for purposes of example and to reduce complexity of the drawings and description, and that variations on the processing described are possible and are considered within the scope of the process 400. For example, the background processing example described below illustrates complete download of internal implementations for executable modules and replacing a previously installed virtual module with a downloaded executable module. Alternatively, the on-demand processing example described below illustrates partial download of internal implementations of executable modules and incorporation of the downloaded internal implementation portions into the installed virtual module to provide functionality to the virtual module without requiring a complete download of the entire internal implementation of the executable module. However, it should further be noted that other variants, such as background download of portions of internal implementations of executable modules is possible and considered within the scope of the process 400. For details of example processing for portions of internal implementations, the on-demand portion of the process 400 may be referenced with associated modifications to the background download processing for respective portions of internal implementations of executable modules. Additionally, for purposes of replacing installed virtual modules with executable modules on demand, the background portion of the process 400 may be referenced. Many other variations and possibilities for processing to migrate between installed virtual modules and executable module implementations are possible and all are considered within the scope of the present subject matter.

Continuing with the present example, processing associated with an affirmative determination at decision point 436 will be described further below. As such, in response to determining at decision point 436 to begin a background download of an internal implementation of one or more executable modules, the process 400 begins a background download of the selected executable module(s) at block 438. As such, the process 400 may download the executable module as a background operation during runtime. At decision point 440, the process 400 makes a determination as to whether the respective executable module(s) is/are downloaded. As described above, the processing associated with the process 400 may be multi-threaded with a separate thread assigned to process each module. In response to determining that one or more of the selected modules are downloaded, the process 400 replaces the previously-installed virtual module with the respective downloaded executable module within the system during runtime at block 442. As such, the process 400 may swap entire executable modules into the system during runtime to replace installed and resolved virtual modules. The process 400 returns to decision point 432 and iterates as described above.

Returning to the description of decision point 436, in response to determining to perform on-demand migration of resources for at least one virtual module, the process 400 waits at decision point 444 until a determination is made that a module access to the respective virtual module has been requested/detected. For purposes of the present description, it is understood that the module access represents a system-level request to access at least one portion of the internal module implementation of the executable module associated with the installed virtual runtime module. It is understood that the module access request represents a request to access resources (internal implementation functionality) of the associated executable module that is not currently installed, and that the virtual module has been installed in place of the executable module as described above.

For any given virtual module, in response to determining at decision point 444 that a module access to the respective virtual module has been requested/detected, the process 400 blocks access to the respective virtual module temporarily at block 446 while processing is performed to populate the virtual module with the resources associated with the access request. At block 448, the process 400 identifies/determines the internal resources of the internal module implementation of the executable module that are to be accessed by the system-level request. At block 450, the process 400 requests the identified accessed resources associated with the executable module from the module repository. As such, the process 400 downloads the determined internal resources of the internal module implementation of the executable module. Further, where the virtual runtime module includes a proxy layer, that proxy layer may communicate with a module repository, and the process 400 may initiate, via the proxy layer of the virtual runtime module, the download of the determined internal resources of the internal module implementation of the executable module from the module repository.

At decision point 452, the process 400 makes a determination as to whether the requested resources have been received. In response to determining that the requested resources have been received, the process 400 integrates the received resources (internal implementation functionality) into the respective installed virtual module at block 454. As such, the process 400 adds the internal resources of the internal module implementation of the executable module associated with the request to the virtual runtime module. For implementations that use weak references to track when modules may be reverted, the process 400 may create a weak reference to each added internal resource of the internal module implementation. For implementations where the virtual runtime module includes a proxy layer that communicates with a module repository, the proxy layer may receive the internal resources of the internal module implementation of the executable module and may add the internal resources of the internal implementation of the executable module to the virtual runtime module. At block 456, the process 400 allows access to the requested resources associated with the resource access request, thereby terminating the temporary resource access block. It is understood that once a portion of the internal implementation of a virtual module has been installed, it may be accessed by access requests without additional processing by the process 400.

At decision point 458, the process 400 makes a determination as to whether the installed resources result in a complete executable virtual module with an internal implementation that is internally equivalent to the associated executable module. In response to determining that the installed resources do not result in a complete executable virtual module with an internal implementation that is internally equivalent to the associated executable module, the process 400 returns to decision point 444 to determine whether an access request associated with any other portions of the internal implementation of the associated executable module that have not yet been installed into the virtual module has been detected. The process 400 iterates as described above for each virtual module selected for on-demand migration.

Returning to the description of decision point 458, in response to determining that the installed resources result in a complete executable virtual module with an internal implementation that is internally equivalent to the associated executable module for any virtual module, the process 400 identifies the respective virtual module as fully executable and equivalent to the associated executable module at block 460. For implementations with a proxy layer within the virtual module, processing may be performed as described below to revert that portion of a virtual module that has become fully executable to conserve resources consumed by the proxy layer. Alternatively, the installed virtual module that has become fully executable may have the actual executable module downloaded and that executable module may be swapped into the system in place of the virtual module, as appropriate for a given implementation. The process 400 returns to decision point 430 and iterates as described above.

Returning to the description of decision point 430, processing to revert resources may be based upon resource shortages within a system or to form a smaller system image for other reasons, as appropriate for a given implementation. As such, at decision point 430, in response to determining to begin processing to revert any portion of an executable module to remove at least a portion of the internal implementation of the respective executable module(s) (again whether partially executable or fully executable), the process 400 identifies the least-used resource(s) associated with the respective executable module at block 462. Again, as described above, this processing may include reversion of a proxy layer of a virtual module that has become fully executable, and the respective proxy layer may be identified as one of the least-used resources. At block 464, the process 400 removes the identified least-used resource(s). As such, the process 400 may revert, during runtime, at least a portion of the executable module implementation installed during runtime, or may revert resources that were initially installed in association with one or more fully-executable modules.

As described above, one example implementation may include using an implementation environment that includes facilities for "weak" references. Objects with weak references may be collected during garbage collection phase if the respective object is only referenced by weak references. As such, garbage collection processing associated with a virtual machine may then collect items referenced with weak references. The process 400 may include being notified (e.g., via a WeakReferenceQueue) of the collection of the weak reference and may use that notification to trigger the decision point 430 to revert resources and the processing at block 464 may include garbage collection processing to actually reclaim the respective resources, as appropriate for a given implementation. Many other possibilities exist for resource removal from installed executable modules, and all are considered to be within the scope of the present subject matter.

The process 400 returns to decision point 430 and iterates as described above. Returning to the description of decision point 434, in response to determining that processing has been completed, the process 400 returns to the processing described in association with FIG. 4A at block 402, and iterates as described above.

As such, the process 400 provides for selective installation of virtual modules within a module based system. Virtual modules may be constructed from metadata that defines a runtime resolvable interface for associated executable modules, either locally or at a module repository, and the virtual modules may be installed and resolved within the system. Processing to migrate installed virtual modules to executable modules may be performed on demand as module resources are accessed, or may be performed as a background task, as appropriate for a given module and implementation. Internal implementations of executable modules may also be reverted to virtual implementations of either entire modules or for portions of internal implementations of executable modules, regardless of whether the executable modules were initially implemented as virtual modules.

As described above in association with FIG. 1 through FIG. 4B, the example systems and processes provide virtual module-based ultra-lazy installation for modular systems. Many other variations and additional activities associated with virtual module-based ultra-lazy installation for modular systems are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
obtaining, via a processor within a module-based system, a virtual runtime module that omits an internal functional implementation of an associated executable module and that comprises a runtime-resolvable public interface of the associated executable module comprising:
requesting the executable module from a module repository;
receiving a module description comprising metadata that defines the runtime-resolvable public interface of the associated executable module; and
creating the virtual runtime module using the module description; and the method further comprising:
resolving, using the runtime-resolvable public interface of the virtual runtime module, the virtual runtime module within the module-based system to satisfy dependencies associated with the executable module within the module-based system where the resolved virtual runtime module is within the module-based system instead of the executable module upon resolution of the virtual runtime module within the module-based system; and
installing, during runtime using the resolved virtual runtime module, at least a portion of the internal functional implementation of the associated executable module within the module-based system.

2. The method of claim 1, where the module repository creates virtual modules and where obtaining, via the processor within the module-based system, the virtual runtime module that omits the internal functional implementation of the associated executable module and that comprises the runtime-resolvable public interface of the associated executable module comprises:
requesting the virtual runtime module from the module repository; and
receiving the virtual runtime module from the module repository.

3. The method of claim 1, where installing, during runtime using the resolved virtual runtime module, at least the portion of the internal functional implementation of the associated executable module within the module-based system comprises:
downloading the executable module as a background operation during runtime; and
replacing the virtual runtime module with the downloaded executable module during runtime.

4. The method of claim 1, where installing, during runtime using the resolved virtual runtime module, at least the portion of the internal functional implementation of the associated executable module within the module-based system comprises:
receiving, in association with the virtual runtime module, a system-level request to access at least one portion of the internal functional implementation of the executable module;
determining which internal resources of the internal functional implementation of the executable module are accessed by the system-level request;
downloading the determined internal resources of the internal functional implementation of the executable module; and
adding the internal resources of the internal functional implementation of the executable module associated with the request to the virtual runtime module.

5. The method of claim 4, where the virtual runtime module further comprises a proxy layer that communicates with the module repository and where:
downloading the determined internal resources of the internal functional implementation of the executable module comprises initiating, via the proxy layer of the virtual runtime module, the download of the determined internal resources of the internal functional implementation of the executable module from the module repository; and
adding the internal resources of the internal functional implementation of the executable module associated with the request to the virtual runtime module comprises:
receiving, at the proxy layer of the virtual runtime module, the internal resources of the internal functional implementation of the executable module; and
adding, via the proxy layer, the internal resources of the internal functional implementation of the executable module to the virtual runtime module.

6. The method of claim 1, further comprising reverting, during the runtime, at least the portion of the internal functional implementation of the executable module installed during the runtime.

7. A system, comprising:
a memory; and
a processor programmed to:
obtain, within a module-based system, a virtual runtime module that omits an internal functional implementation of an associated executable module and that comprises a runtime-resolvable public interface of the associated executable module comprising the processor being programmed to:
request the executable module from a module repository;
receive a module description comprising metadata that defines the runtime-resolvable public interface of the associated executable module; and
create the virtual runtime module using the module description; and
where the processor is further programmed to:
resolve, using the runtime-resolvable public interface of the virtual runtime module, the virtual runtime module within the module-based system to satisfy dependencies associated with the executable module within the module-based system, where the resolved virtual runtime module is within the module-based system instead of the executable module upon resolution of the virtual runtime module within the module-based system; and
install, within the memory during runtime using the resolved virtual runtime module, at least a portion of the internal functional implementation of the associated executable module within the module-based system.

8. The system of claim 7, where the module repository creates virtual modules and where in being programmed to obtain, within the module-based system, the virtual runtime module that omits the internal functional implementation of the associated executable module and that comprises the runtime-resolvable public interface of the associated executable module, the processor is programmed to:
- request the virtual runtime module from the module repository; and
- receive the virtual runtime module from the module repository.

9. The system of claim 7, where in being programmed to install, within the memory during runtime using the resolved virtual runtime module, at least the portion of the internal functional implementation of the associated executable module within the module-based system, the processor is programmed to:
- download the executable module as a background operation during runtime; and
- replace the virtual runtime module with the downloaded executable module during runtime.

10. The system of claim 7, where in being programmed to install, within in the memory during runtime using the resolved virtual runtime module, at least the portion of the internal functional implementation of the associated executable module within the module-based system, the processor is programmed to:
- receive, in association with the virtual runtime module, a system-level request to access at least one portion of the internal functional implementation of the executable module;
- determine which internal resources of the internal functional implementation of the executable module are accessed by the system-level request;
- download the determined internal resources of the internal functional implementation of the executable module; and
- add the internal resources of the internal functional implementation of the executable module associated with the request to the virtual runtime module.

11. The system of claim 7, where the processor is further programmed to revert, during the runtime, at least the portion of the internal functional implementation of the executable module installed during the runtime.

12. A computer program product, comprising:
a computer readable storage medium having computer readable program code embodied therewith, where the computer readable program code when executed on a computer causes the computer to:
- obtain, within a module-based system, a virtual runtime module that omits an internal functional implementation of an associated executable module and that comprises a runtime-resolvable public interface of the associated executable module where the computer readable program code when executed on the computer causes the computer to:
  - request the executable module from a module repository;
  - receive a module description comprising metadata that defines the runtime-resolvable public interface of the associated executable module; and
  - create the virtual runtime module using the module description; and
- where the computer readable program code when executed on the computer further causes the computer to:
  - resolve, using the runtime-resolvable public interface of the virtual runtime module, the virtual runtime module within the module-based system to satisfy dependencies associated with the executable module within the module-based system; and
- install, during runtime using the resolved virtual runtime module, at least a portion of the internal functional implementation of the associated executable module within the module-based system.

13. The computer program product of claim 12, where the module repository creates virtual modules and where in causing the computer to obtain, within the module-based system, the virtual runtime module that omits the internal functional implementation of the associated executable module and that comprises the runtime-resolvable public interface of the associated executable module, the computer readable program code when executed on the computer causes the computer to:
- request the virtual runtime module from the module repository; and
- receive the virtual runtime module from the module repository.

14. The computer program product of claim 12, where in causing the computer to install, during runtime using the resolved virtual runtime module, at least the portion of the internal functional implementation of the associated executable module within the module-based system, the computer readable program code when executed on the computer causes the computer to:
- download the executable module as a background operation during runtime; and
- replace the virtual runtime module with the downloaded executable module during runtime.

15. The computer program product of claim 12, where in causing the computer to install, during runtime using the resolved virtual runtime module, at least the portion of the internal functional implementation of the associated executable module within the module-based system, the computer readable program code when executed on the computer causes the computer to:
- receive, in association with the virtual runtime module, a system-level request to access at least one portion of the internal functional implementation of the executable module;
- determine which internal resources of the internal functional implementation of the executable module are accessed by the system-level request;
- download the determined internal resources of the internal functional implementation of the executable module; and
- add the internal resources of the internal functional implementation of the executable module associated with the request to the virtual runtime module.

16. The computer program product of claim 15, where the virtual runtime module further comprises a proxy layer that communicates with the module repository and where in causing the computer to:
- download the determined internal resources of the internal functional implementation of the executable module, the computer readable program code when executed on the computer causes the computer to initiate, via the proxy layer of the virtual runtime module, the download of the determined internal resources of the internal functional implementation of the executable module from the module repository; and
- add the internal resources of the internal functional implementation of the executable module associated with the request to the virtual runtime module, the computer readable program code when executed on the computer causes the computer to:
  - receive, at the proxy layer of the virtual runtime module, the internal resources of the internal functional implementation of the executable module; and add, via the proxy layer, the internal resources of the internal functional implementation of the executable module to the virtual runtime module.

17. The computer program product of claim 12, where the computer readable program code when executed on the computer further causes the computer to revert, during the runtime, at least the portion of the internal functional implementation of the executable module installed during the runtime.

* * * * *